(12) United States Patent
Huruta

(10) Patent No.: US 7,481,316 B2
(45) Date of Patent: Jan. 27, 2009

(54) ARTICLE STORAGE CASE

(76) Inventor: Yoshihisa Huruta, 30-8, Nakajima 1-chome, Hamamatsu-shi, Sizuoka 430-0856 (JP)

(*) Notice: Subject to any disclaimer, the term of this patent is extended or adjusted under 35 U.S.C. 154(b) by 623 days.

(21) Appl. No.: 10/542,072

(22) PCT Filed: Sep. 13, 2004

(86) PCT No.: PCT/JP2004/013695

§ 371 (c)(1),
(2), (4) Date: Jul. 13, 2005

(87) PCT Pub. No.: WO2005/028321

PCT Pub. Date: Mar. 31, 2005

(65) Prior Publication Data

US 2006/0113303 A1    Jun. 1, 2006

(30) Foreign Application Priority Data

Sep. 18, 2003  (JP) .............................. 2003-325963

(51) Int. Cl.
*B65D 21/00* (2006.01)
*B65D 85/62* (2006.01)

(52) U.S. Cl. .................................. 206/506; 220/23.4

(58) Field of Classification Search ................. 206/504, 206/506, 507; 220/23.4, 23.6
See application file for complete search history.

(56) References Cited

U.S. PATENT DOCUMENTS 3,131,829 A * 5/1964 Masser ........................ 206/144
4,027,796 A * 6/1977 Martin ........................ 206/507
4,823,955 A * 4/1989 Apps ........................... 206/506
5,042,674 A * 8/1991 Ramsay et al. ............. 220/4.24
D407,929 S * 4/1999 Woodring .................... D6/510

FOREIGN PATENT DOCUMENTS

| JP | 52-171527 | 12/1977 |
|---|---|---|
| JP | 8-282757 A | 10/1983 |
| JP | U-S58-192228 | 12/1983 |
| JP | 11-1233 A | 1/1990 |
| JP | U-S06-80638 | 11/1994 |
| JP | 2003-95247 A | 4/2003 |

* cited by examiner

*Primary Examiner*—Anthony D Stashick
*Assistant Examiner*—Harry A Grosso
(74) *Attorney, Agent, or Firm*—Posz Law Group, PLC

(57) ABSTRACT

It is an object of the present invention to obtain in an inexpensive manner a case that allows adjacent cases to be connected to each other, and to provide an article accommodating case that can easily be recycled. In order to achieve this object, an article accommodating case 1 having the shape of a rectangular solid that has an opening 2 at the top is formed, this article accommodating case being characterized in that flanges 3 that protrude outward are formed on the outside surfaces of the opening edges of the respective side walls 1*a*, 1*a*, 1*a*, 1*a*, and the respective coupling elements of dovetail projections 4*a* and dovetail grooves 4*b* of dovetail coupling means 4 are formed in the flanges 3 of the side walls 1*a*, 1*a* that face each other.

16 Claims, 16 Drawing Sheets

ARTICLE STORAGE CASE

TECHNICAL FIELD

The present invention relates to an article accommodating case, and more particularly relates to an article accommodating case which makes it possible to connect cases to each other side by side.

BACKGROUND ART

In factories and the like, article accommodating cases that are molded from plastic are used to accommodate articles for storage and shipping.

Furthermore, such article accommodating cases also include cases equipped with connecting means that connect the cases to each other so that there is no collapse of the load when these cases are placed side by side on pallets, and are further stacked and transported by means of a forklift.

For example, in the article accommodating case (plastic container) disclosed in Japanese Patent Application Laid-Open No. 7-52950, permanent magnets are attached to the side surfaces of the case as connecting means, and adjacent cases are connected to each other by the magnetic force of these magnets.

Furthermore, in the article accommodating case (container) disclosed in Japanese Patent Application Laid-Open No. 9-169339, connecting fittings are attached to the edge parts of the upper opening of the case so that these connecting fittings are free to pivot, and respective anchoring parts that are caused to protrude from these connecting fittings are caused to engage with the upper edges and connecting fittings of mating cases.

However, in both of these cases described in the abovementioned Japanese patent references, permanent magnets or connecting fittings that are separate parts must be attached to the case main body, so that the cost is correspondingly increased; furthermore, the attached permanent magnets or connecting fittings must be removed at the time of recycling, which is inconvenient.

Furthermore, although commonly used article accommodating cases molded from plastic have a considerable weight in a state in which articles are accommodated in the case, and are therefore not blown about by the wind when such cases are placed in outdoor locations that are exposed to the wind, these cases do tend to be blown about by the wind when the cases are in an empty state; accordingly, when such cases are placed in outdoor locations, it is necessary to place weights on the cases, or to connect the cases by means of ropes or the like, so that the cases are not blown about by the wind.

Furthermore, when cases that are placed in outdoor locations are exposed to rain, water accumulates inside the cases, so that an operation that removes water from the cases is essential at the time of use. Moreover, especially in instances where articles are accommodated inside the cases, an operation that removes only the water from the insides of the cases is an extremely difficult operation, so that the working characteristics during use are poor.

Furthermore, in instances where empty cases are stored in a stacked state, the peripheral edges of the bottom surfaces of the cases in the upper tiers are placed on the upper edges of the openings of the cases positioned below in the same manner as when articles are accommodated in the cases; accordingly, the stacked cases are bulky, and require a large storage space.

Moreover, since common cases have a shape in which the entire undersurface of the bottom of the case contacts the ground, the ground contact state deteriorates in cases where the central portion of the bottom of the case sags downward as a result of changes over time caused by the weight of the accommodated articles, and there have been instances in which such cases have an unstable position that shows wobbling when the case is placed on a flat surface.

The present invention was devised in light of the various problems seen in the abovementioned conventional general article accommodating cases; it is an object of the present invention to provide an article accommodating case which makes it possible to obtain (in an inexpensive manner) cases that allow adjacent cases to be connected to each other, which makes it possible to fasten the cases in a stable manner, which shows no accumulation of rain water or the like inside the cases, which shows no problems of bulkiness when empty cases are stored, and which guarantees secure ground contact even if the central portion of the bottom wall of the case should sag downward as a result of changes over time.

DISCLOSURE OF THE INVENTION

In the present invention, in order to solve the abovementioned problems, an article accommodating case having the shape of a rectangular solid that is open at the top is formed, this article accommodating case being characterized in that flanges that protrude outward are formed on the outside surfaces of the opening edges of the respective side walls, and the respective coupling elements of dovetail projections and dovetail grooves of dovetail coupling means are formed in the flanges of side walls that face each other.

In the article accommodating case of the present invention, the coupling elements of the dovetail projections and dovetail grooves of dovetail coupling means can be formed as integral parts of the case without any need to add special separate parts for the purpose of connecting the cases to each other; accordingly, the manufacturing cost can be reduced, and an article accommodating case that is easy to recycle can be provided.

In the present invention, furthermore, an article accommodating case is constructed in which the respective coupling elements of the dovetail projections and dovetail grooves of dovetail coupling means are formed so that these elements are inclined with respect to the flanges in the abovementioned invention In the article accommodating case of this invention, coupling by means of dovetail projections and dovetail groves is performed in an inclined state so that these elements tend not to slip out; accordingly, an article accommodating case that allows stacking in a more stable state can be provided.

Furthermore, in the present invention, an article accommodating case is formed in which through-holes are formed in the abovementioned flanges in the abovementioned invention.

In the article accommodating case of this invention, the blowing about of the cases by the wind, or collapse of the load and the like, can be prevented by inserting rod form members or the like into the through-holes, and sticking the lower ends of these rod form members into the ground surface, or by inserting rod form members or ropes into holes that are lined up in the vertical direction when the cases are stacked in a plurality of tiers, so that the cases are connected in the vertical direction.

Furthermore, in the present invention, an article accommodating case is formed in which the through-holes formed in the flanges in the abovementioned invention also act as water escape holes.

In the article accommodating case of this invention, rain water or the like can be discharged via the water escape hole;

accordingly, there is no need for an operation to remove rain water or the like, and there is no increase in weight during the transportation of the cases.

Furthermore, in the present invention, an article accommodating case is formed in which legs are formed on the four corners of the bottom wall of the abovementioned case in the abovementioned invention.

In the article accommodating case of this invention, since legs are caused to contact the ground, the case can be caused to contact the ground in a stable manner even if the central portion of the bottom wall of the case should sag downward due to changes over time.

Furthermore, in the present invention, an article accommodating case is formed which is devised so that in the abovementioned invention, the respective side walls of the abovementioned case are inclined to the inside in the downward direction, beads that protrude inward are formed on the side walls that face each other, recessed parts of the cases of the upper tier demarcated on the outside surfaces of the side walls by the abovementioned beads are engaged with protruding parts of the cases of the lower tier demarcated on the inside surfaces of the side walls by the abovementioned beads when the cases are in a stacked state, so that the cases of the upper tier are accommodated inside the cases of the lower tier, and when cases of the upper tier are rotated 180 degrees in the horizontal plane and stacked on cases of the lower tier, the bottom walls of the legs of the cases of the upper tier are carried on the upper walls of the abovementioned beads of the cases of the lower tier.

In the article accommodating case of this invention, when cases of the upper tier are stacked on cases of the lower tier that are in an empty state, the cases of the upper tier can be stacked so that these cases are accommodated inside the cases of the lower tier; accordingly, the cases can be stored without becoming excessively bulky.

Furthermore, in the present invention, an article accommodating case is formed in which water escape holes are formed in the bottom wall of the abovementioned case and/or the bottom walls of the legs in the abovementioned invention.

In the article accommodating case of this invention, since rain water or the like can be discharged from the water escape holes, there is no need for an operation to remove rain water or the like, and there is no increase in weight during the transportation of the cases.

BEST MODE FOR CARRYING OUT THE INVENTION

An embodiment of the article accommodating case of the present invention will be described in detail below with reference to the attached figures.

Figure 1:
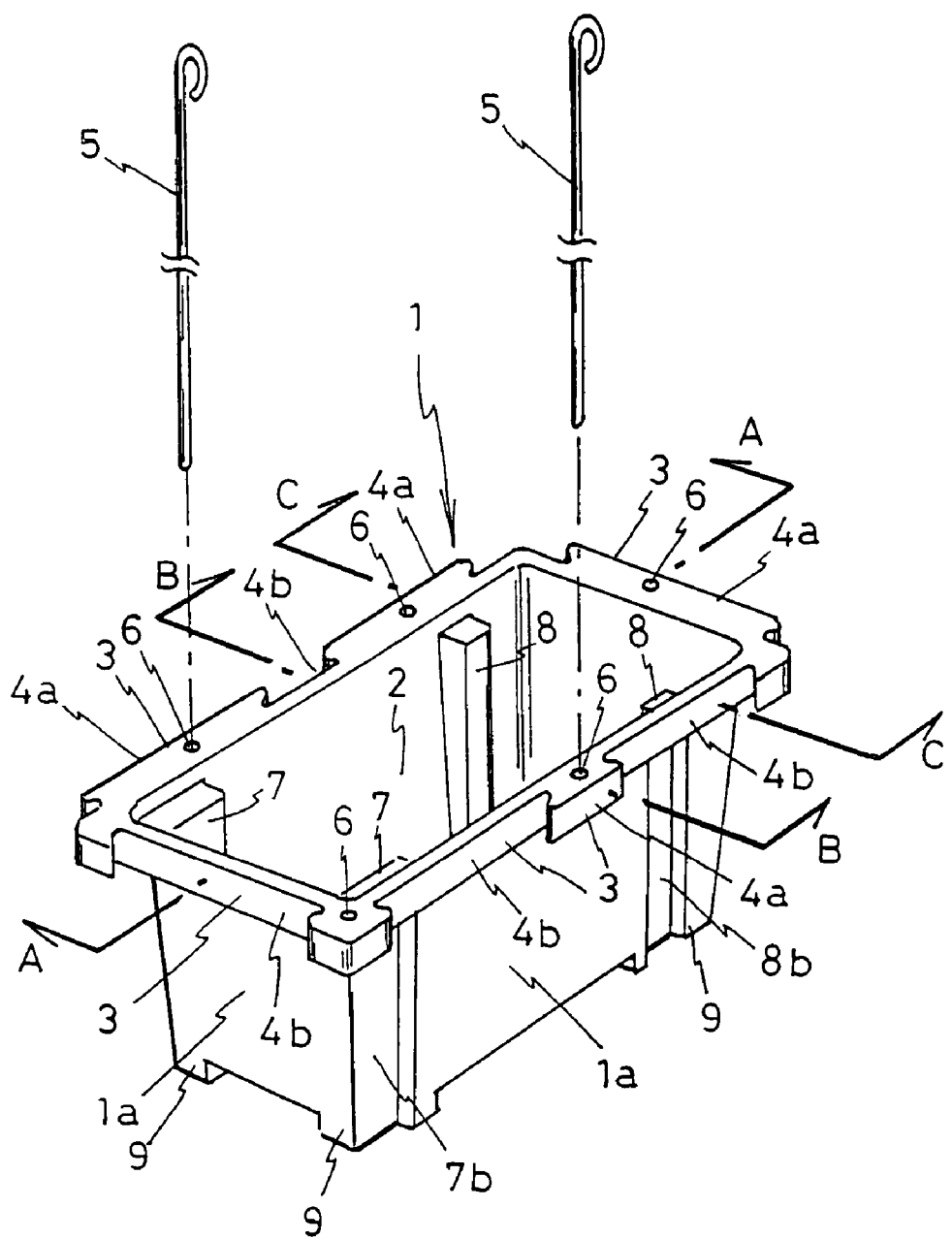
FIG. 1 is a perspective view showing one example of the article accommodating case of the present invention.

The article accommodating case 1 of the present invention shown in the figures is integrally molded from (for example) a plastic; as is shown in FIG. 1, this case 1 has the shape of a rectangular solid, and has an opening 2 at the top. Furthermore, this article accommodating case 1 has respective flanges 3 that extend outward on the on the side walls 1*a* of the peripheral edges of the opening 2, and dovetail projections 4*a* and dovetail grooves 4*b* that constitute the respective elements of dovetail coupling means 4 are formed in these flanges 3. Furthermore, through-holes 6 which also act as water escape holes, and through which rod form members 5 or ropes can be passed are formed in appropriate positions in these flanges 3.

Figure 2:
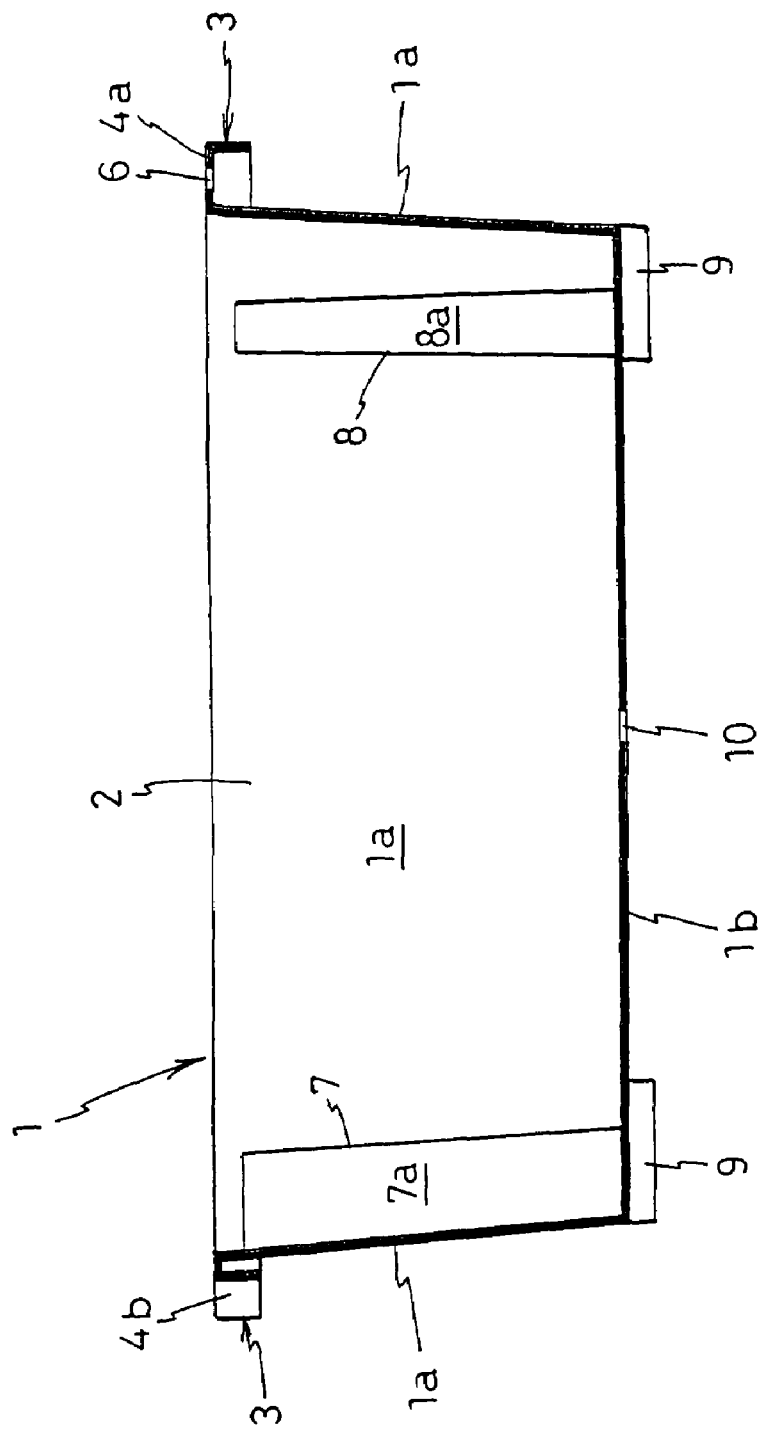
FIG. 2 is a partial sectional view along line A-A in FIG. 1.
Figure 3:
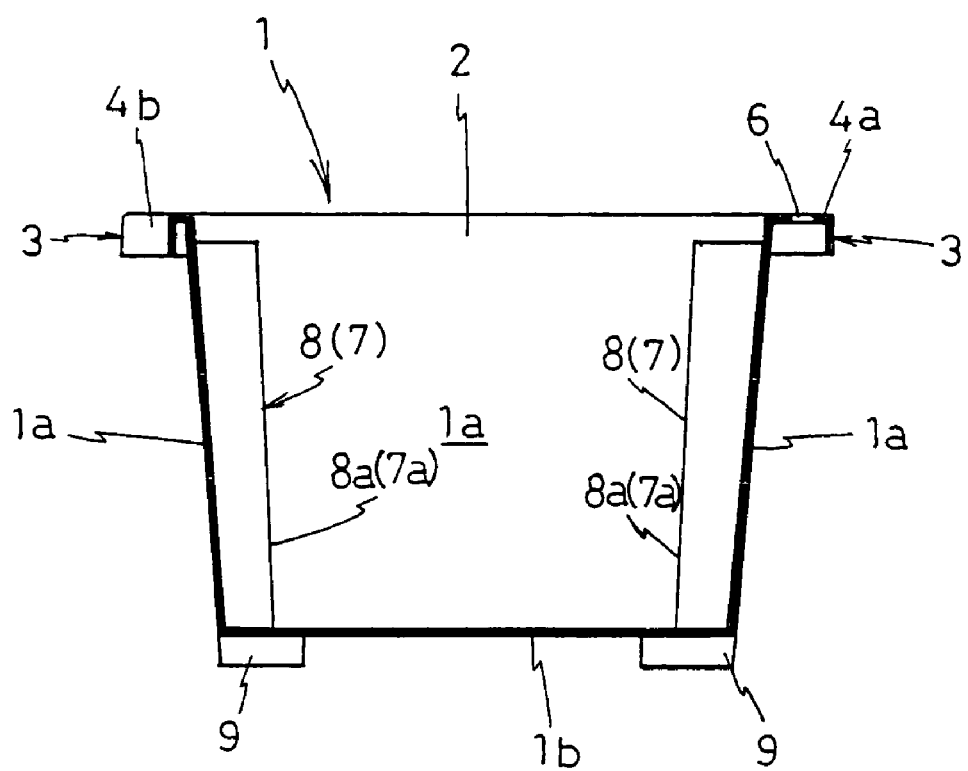
FIG. 3 is a partial sectional view along line B-B in FIG. 1.
Figure 4:
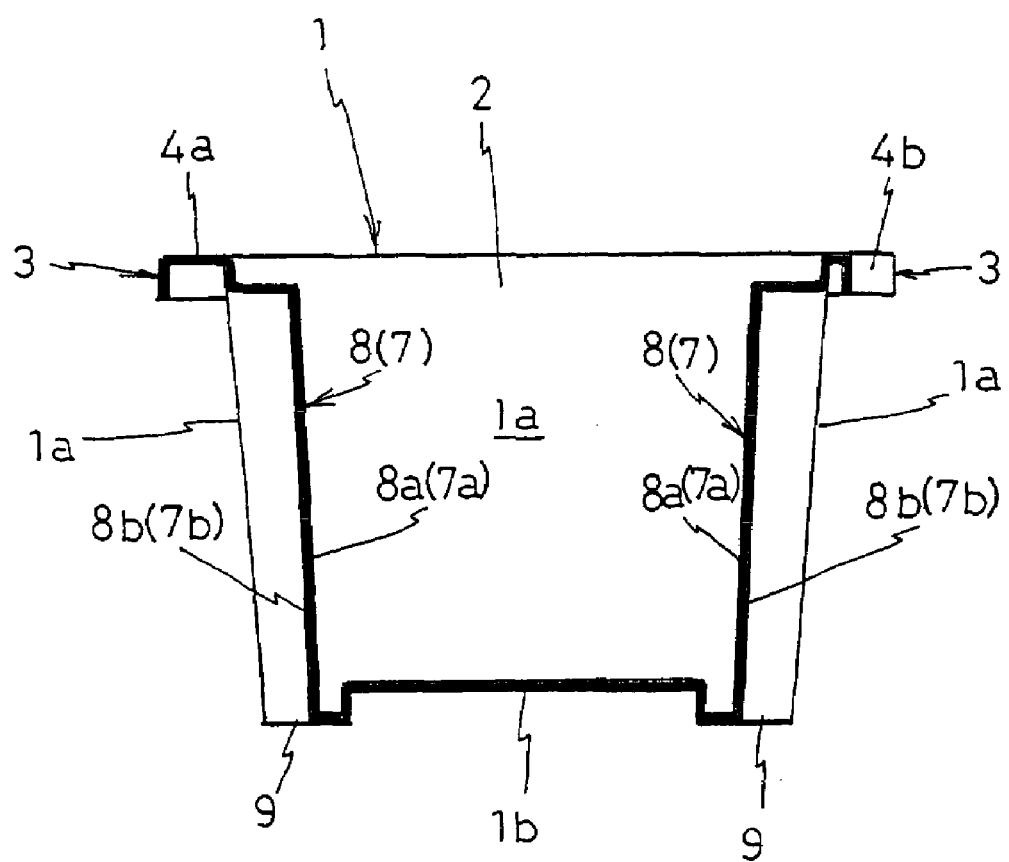
FIG. 4 is a partial sectional view along line C-C in FIG. 1.

Furthermore, the respective side walls 1*a*, 1*a*, 1*a*, 1*a* of the abovementioned article accommodating case 1 are formed so that these side walls are inclined toward the inside in the downward direction. Moreover, two beads 7 and 8 which are caused to protrude inward are respectively formed on the inside surfaces of facing side walls 1*a*, 1*a* (in the present embodiment, facing side walls 1*a*, 1*a* in the longitudinal direction), and, as is shown in FIG. 4, protruding parts 7*a* and 8*a* that protrude with respect to the inside surfaces of the side walls 1*a*, and recessed parts 7*b* and 8*b* that are recessed with respect to the outside surfaces of the side walls 1*a*, are demarcated by these beads 7 and 8. As is shown in FIG. 2, these beads 7 and 8 are formed asymmetrically (in the present embodiment, the distance from the side wall and the width are different for each bead).

Figure 5:
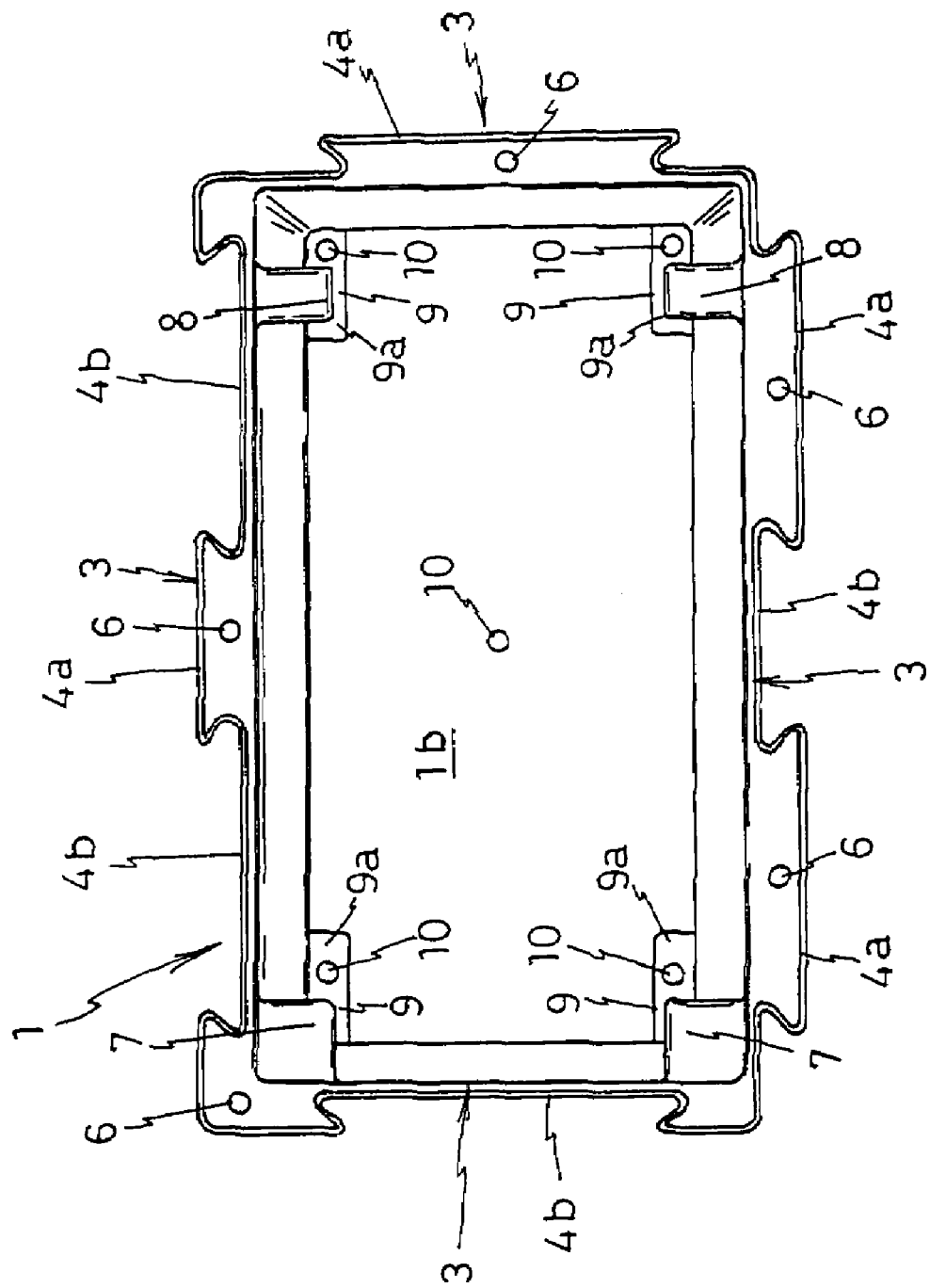
FIG. 5 is a bottom view of the article accommodating case shown in FIG. 1.

Furthermore, in this article accommodating case 1, legs 9 are formed on the four corners of the bottom wall 1*b*. Moreover, as is shown in FIG. 5, water escape holes 10 are respectively formed in the bottom wall 1*b* of the case 1 and the bottom walls 9*a* of the legs 9.

In this article accommodating case 1 of the present invention constructed as described above, blowing about of the case by the wind, load collapse and the like can be prevented by passing rod form members 5 through the through-holes 6, and sticking the lower ends of these rod form members 5 into the ground surface, or by passing rod form members 5 or ropes through the through-holes 6 (lined up in the vertical direction) of article accommodating cases 1 of the present invention that are stacked in a plurality of tiers, so that these article accommodating cases 1 are connected in the vertical direction, as shown in FIG. 1.

Figure 6:
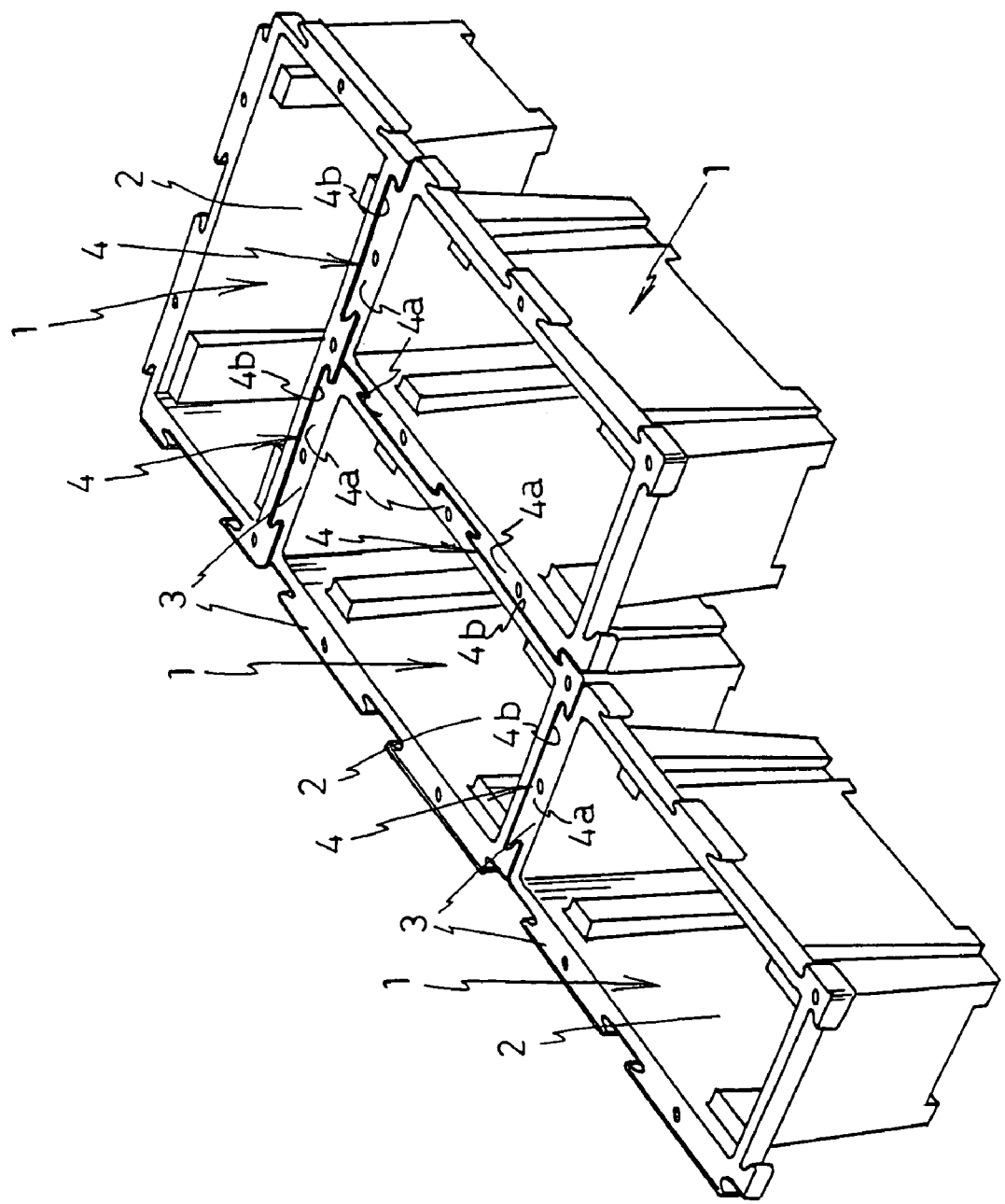
FIG. 6 is a perspective view showing a state in which numerous article accommodating cases of the type shown in FIG. 1 are lined up side by side and connected to each other.

Furthermore, as is shown in FIG. 6, the abovementioned article accommodating cases 1 can be easily and firmly connected to each other by causing dovetail projections 4a formed in the flanges 3 of adjacent cases 1 to engage with dovetail grooves 4b formed in the formed in the flanges 3 of other cases 1, so that load collapse tends not to occur when these cases 1 are places side by side on a pallet, and are further stacked and transported by means of a forklift.

Figure 7:
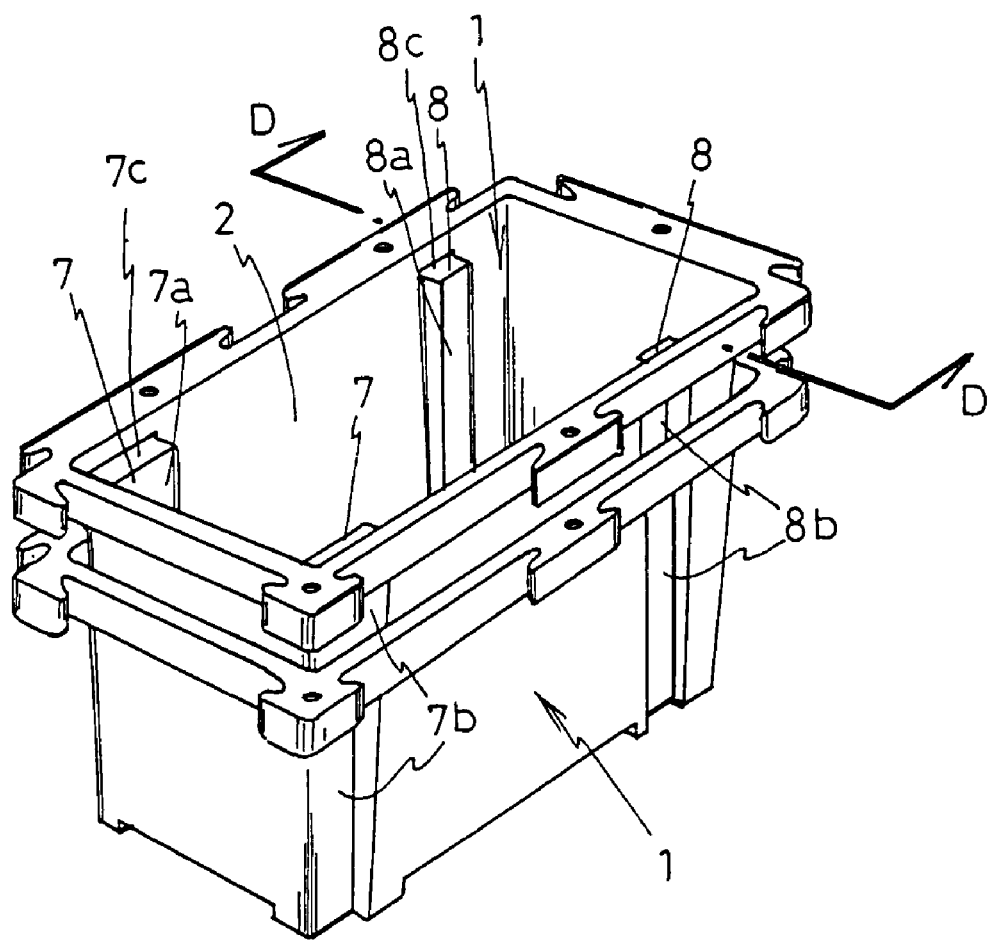
FIG. 7 is a perspective view showing a state in which article accommodating cases of the type shown in FIG. 1 are stacked and stored.
Figure 8:
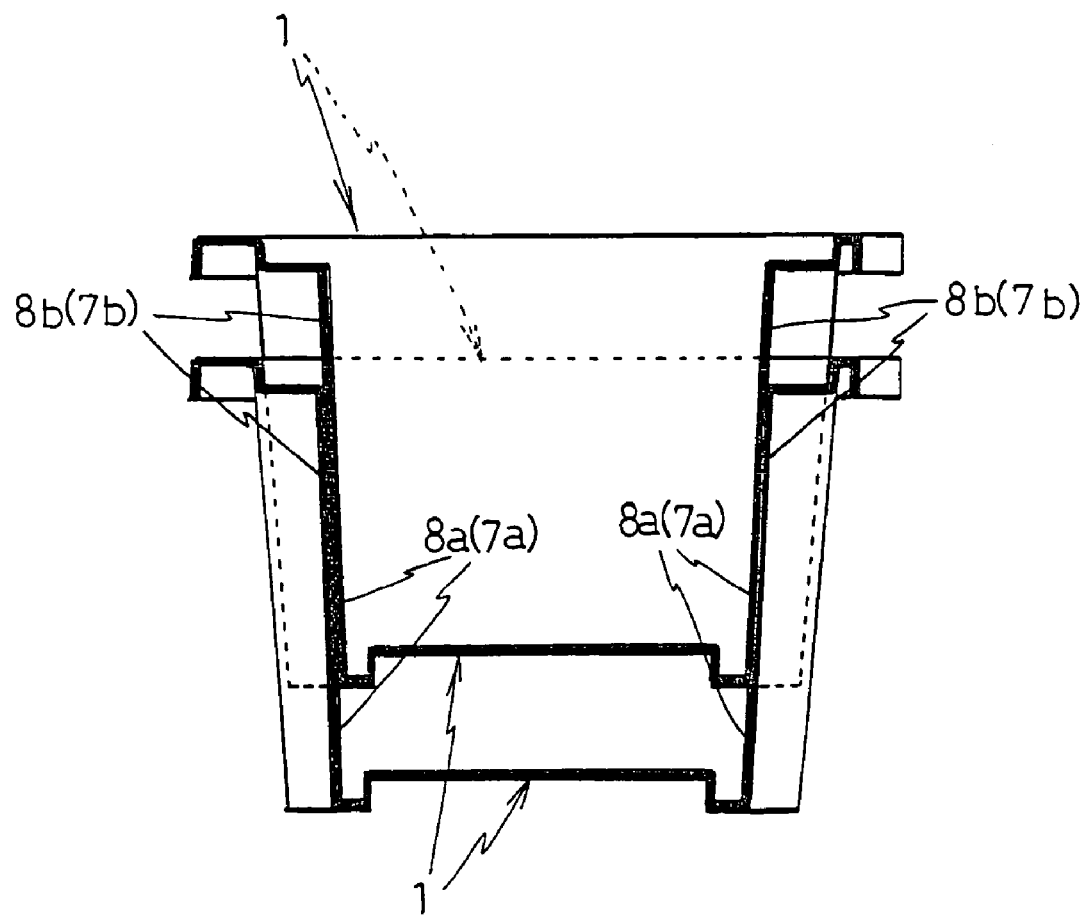
FIG. 8 is a partial sectional view along line D-D in FIG. 7.

Furthermore, as is shown in FIGS. 7 and 8, when the abovementioned article accommodating cases 1, 1 are stored in an empty state in which no articles are accommodated in the cases, the cases 1 are stacked by causing the recessed parts 7b and 8b of the upper-tier cases 1 to engage with the protruding parts 7a and 8a of the cases 1 positioned in the lower tier. In this state, the cases 1 of the upper tier are accommodated inside the cases 1 of the lower tier, so that excessive bulkiness in the height direction is prevented.

Figure 9:
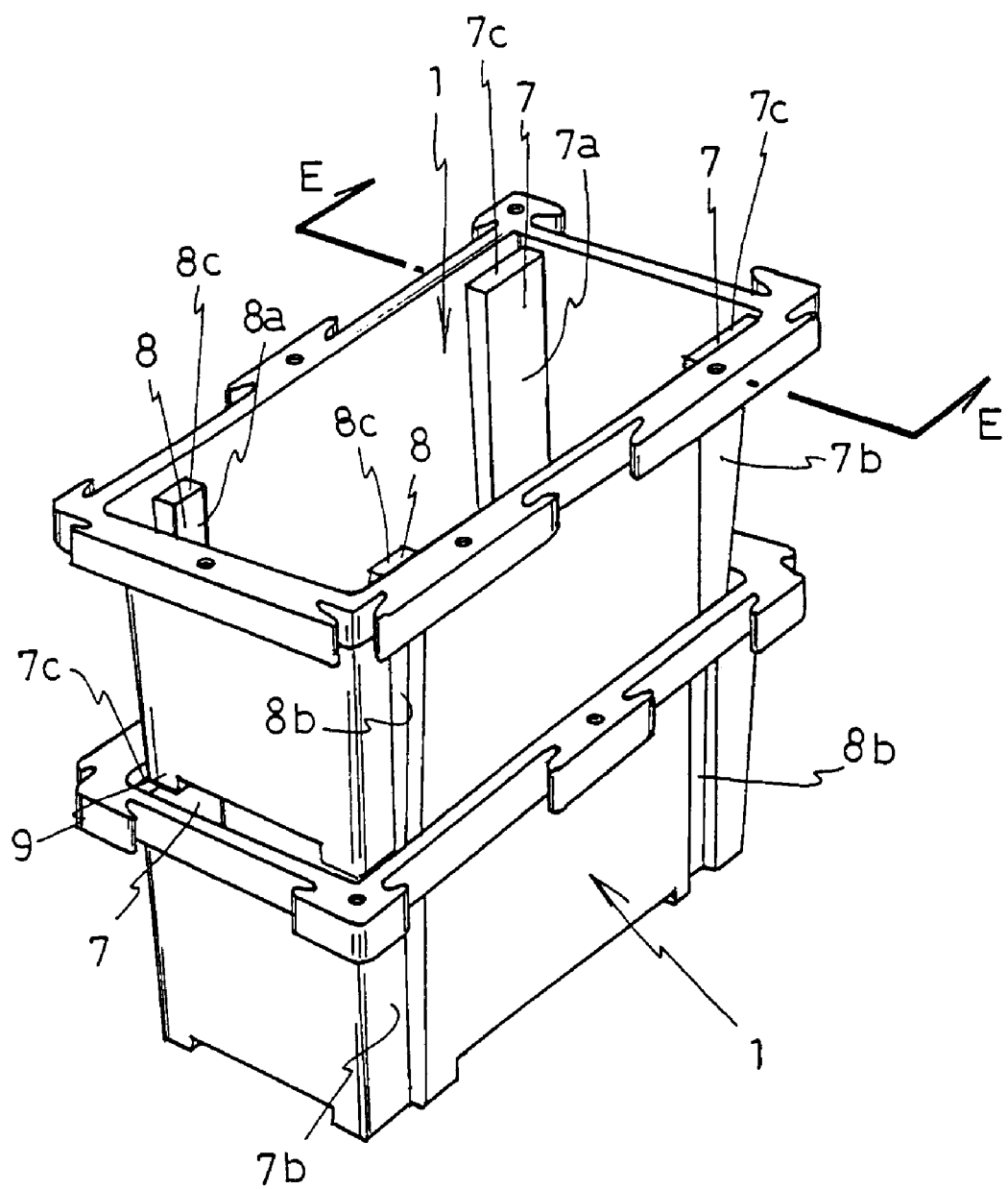
FIG. 9 is a perspective view showing a state in which cases are stacked (in a state in which articles are accommodated in article accommodating cases of the type shown in FIG. 1)
Figure 10:
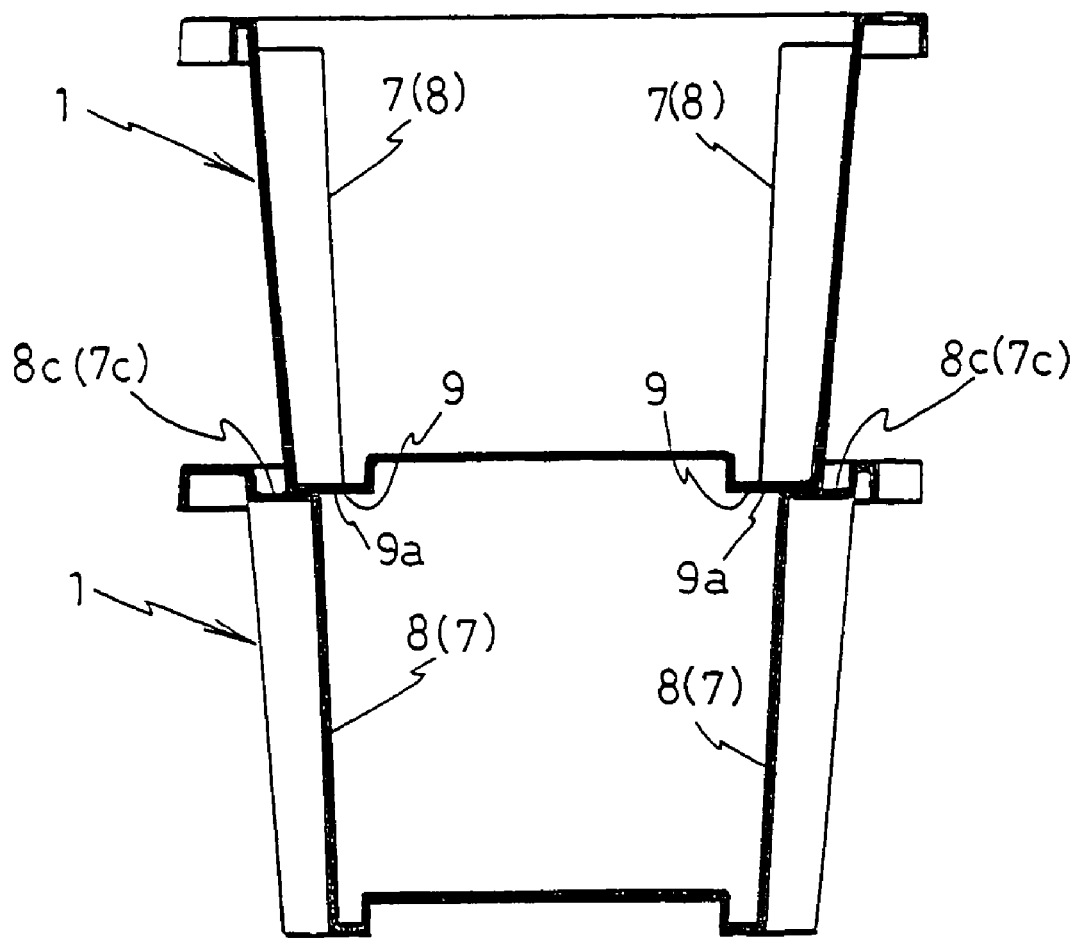
FIG. 10 is a partial sectional view along line E-E in FIG. 9.

Furthermore, as is shown in FIGS. 9 and 10, the abovementioned article accommodating cases 1, 1 are arranged so that the cases 1 of the upper tier are rotated 180 degrees in the horizontal direction with respect to the cases 1 positioned in the lower tier, and are placed on the cases 1 positioned in the lower tier. In this state, the bottom walls 9a of the legs 9 of the cases 1 of the upper tier are carried on the upper walls 7c and 8c of the beads 7 and 8 of the cases 1 of the lower tier, so that the cases 1, 1 are stacked in a state in which no force is applied to the articles accommodated inside the cases.

Figure 11:
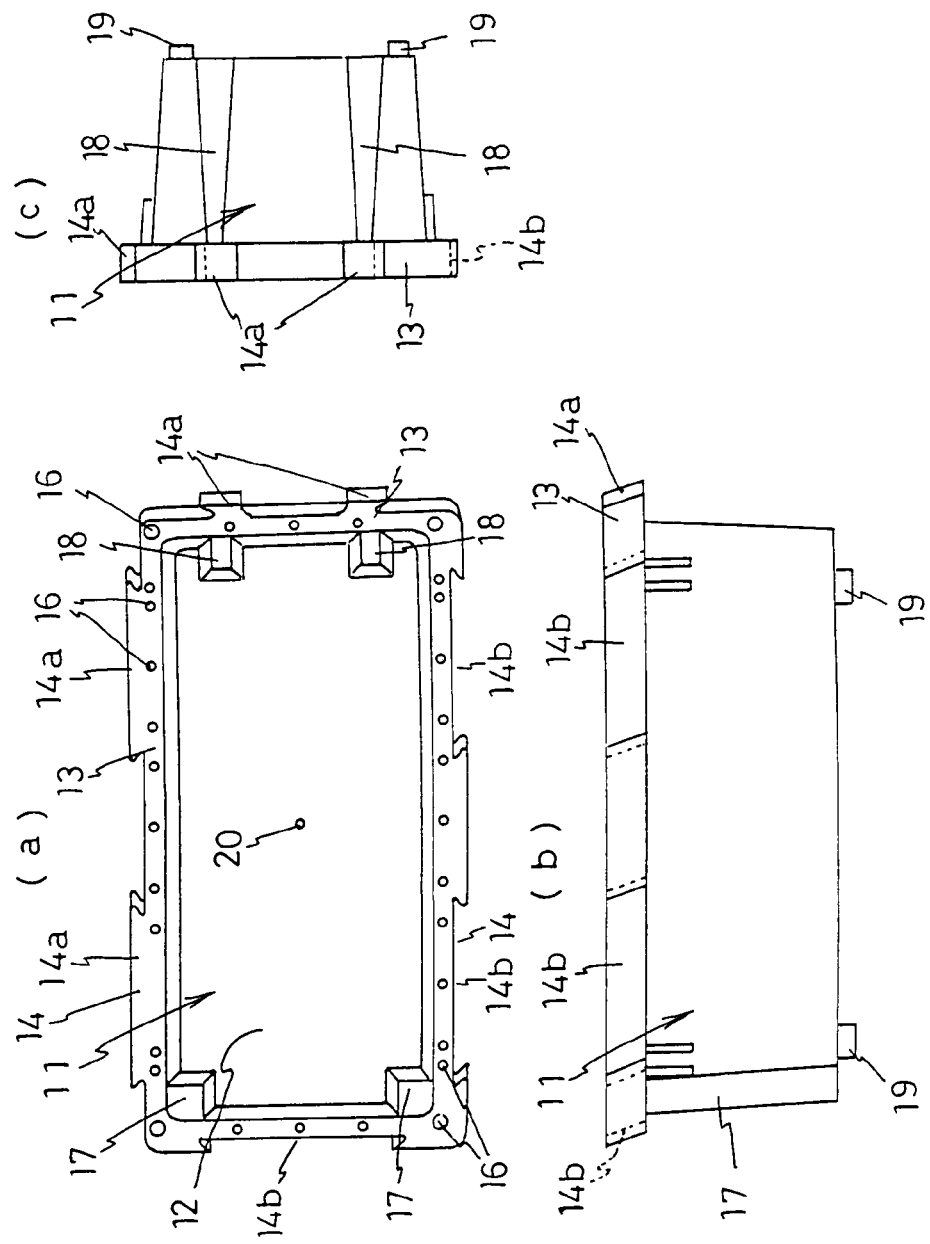
FIG. 11 shows another example of the article accommodating case of the present invention, with FIG. 11 (*a*) being a plan view, FIG. 11 (*b*) being a front view, and FIG. 11 (*c*) being a side view.

FIGS. 11 (a), 11 (b) and 11 (c) show another example of the article accommodating case of the present invention.

This article accommodating case 11 differs from the abovementioned article accommodating case 1 in that the respective coupling elements of dovetail projections 14a and dovetail grooves 14b of dovetail coupling means 14 are in the flanges 13 at an inclination with respect to the longitudinal direction of the case 11, and in that beads 17 and 18 are formed on the facing side walls 11a, 11a in the direction of the short sides. Furthermore, the symbol 12 indicates the opening, the symbol 16 indicates through-holes, the symbol 19 indicates legs, and the symbol 20 indicates water escape holes.

Figure 12:
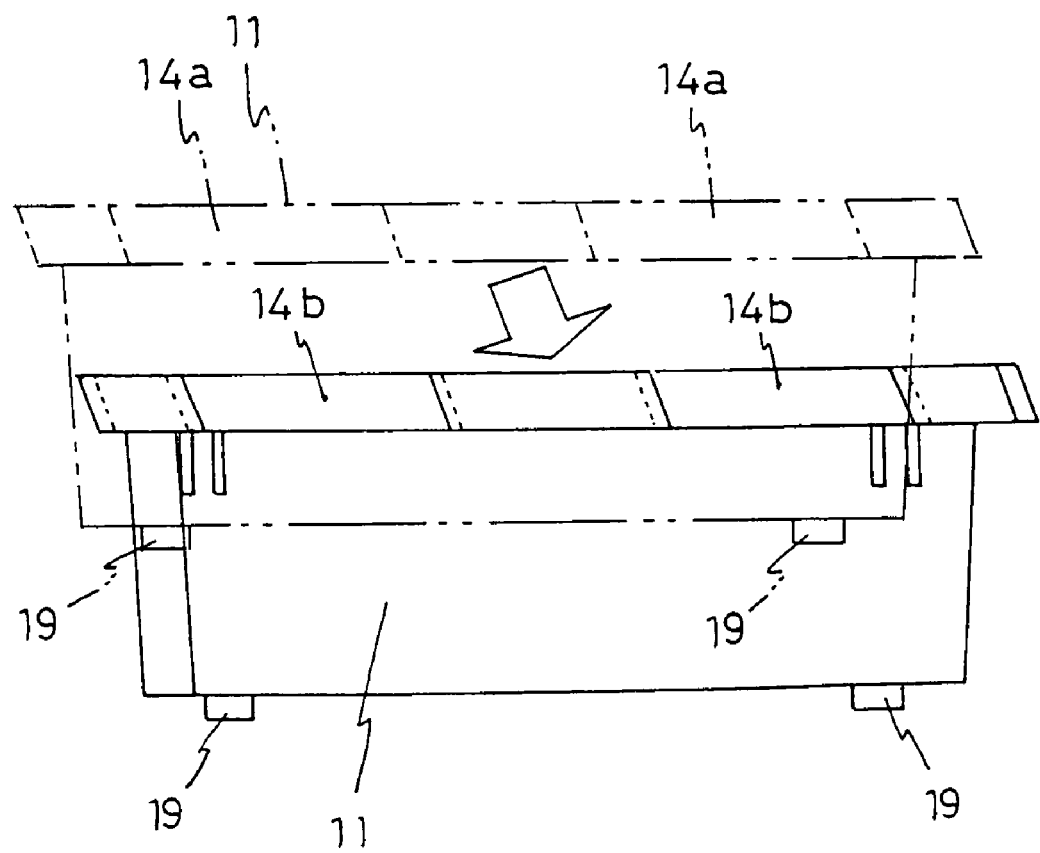
FIG. 12 is a front view showing a state in which article accommodating cases of the type shown in FIG. 11 are connected, with the two-dot chain line indicating the case on the front side that is connected.
Figure 13:
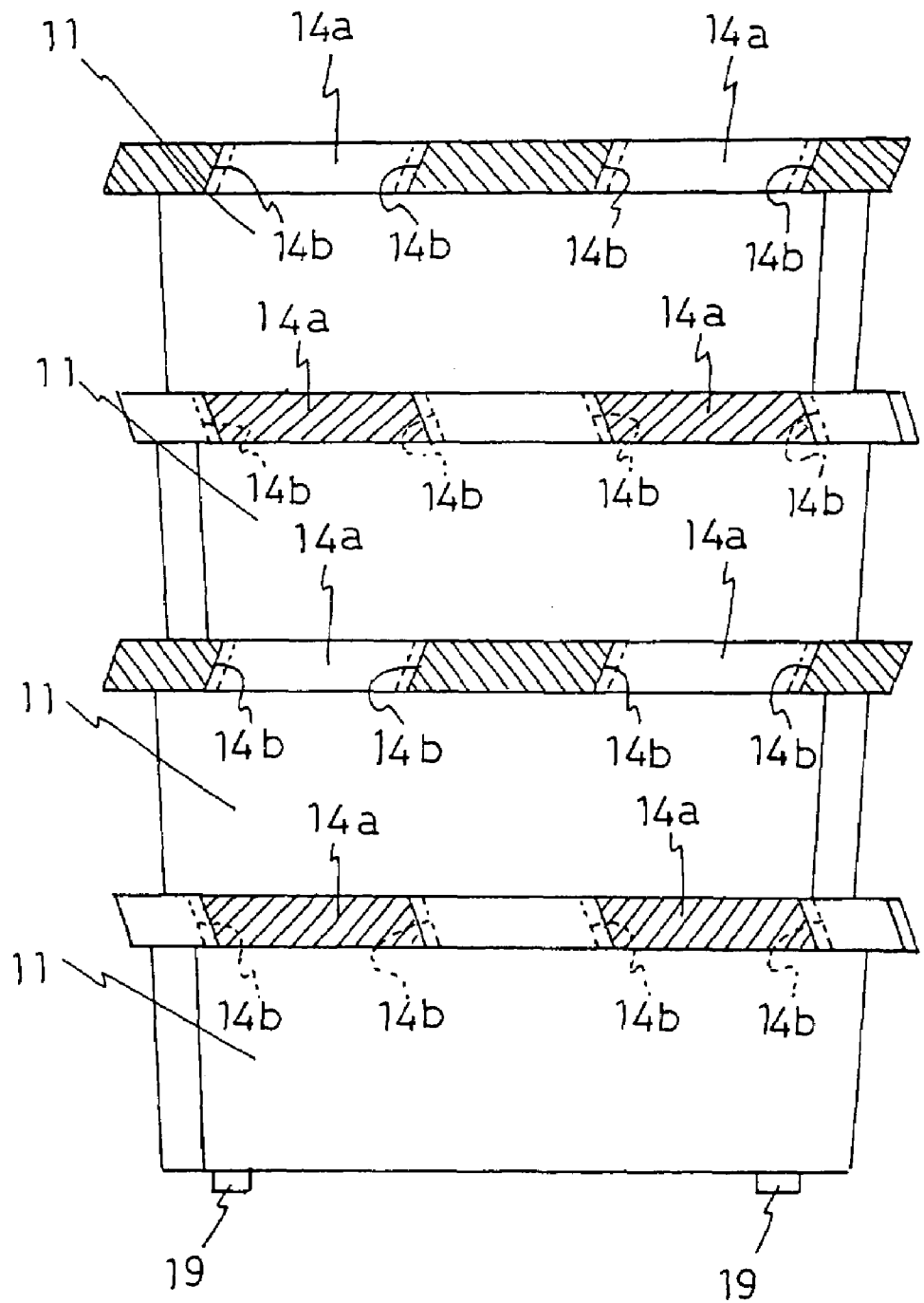
FIG. 13 is a partially sectional front view showing a state in which a plurality of article accommodating cases of the type shown in FIG. 11 are connected and stacked (this view being cut away in the coupling part in the longitudinal direction)

In the article accommodating case 11 shown in FIG. 11, the coupling of the dovetail projections 14a and dovetail grooves 14b of adjacent cases 11, 11 is accomplished by insertion from above at an inclination with respect to the longitudinal direction of the cases as shown in FIG. 12; as a result, the dovetail projections 14a and dovetail grooves 14b are coupled in an inclined state, so that these parts tend not to slip out. In particular, in a stacked state (with articles accommodated in the cases) in which the cases 11 of the upper tier are rotated 180 degrees in the horizontal direction with respect to the cases 11 in the lower tier, and are then placed on the cases 11 positioned in the lower tier, the coupling by means of the dovetail projections 14a and dovetail grooves 14b of adjacent cases 11, 11 is a coupling in which the slip-out direction is alternately different above and below as shown in FIG. 13, so that coupling which tends to prevent load collapse can be realized.

Figure 14:
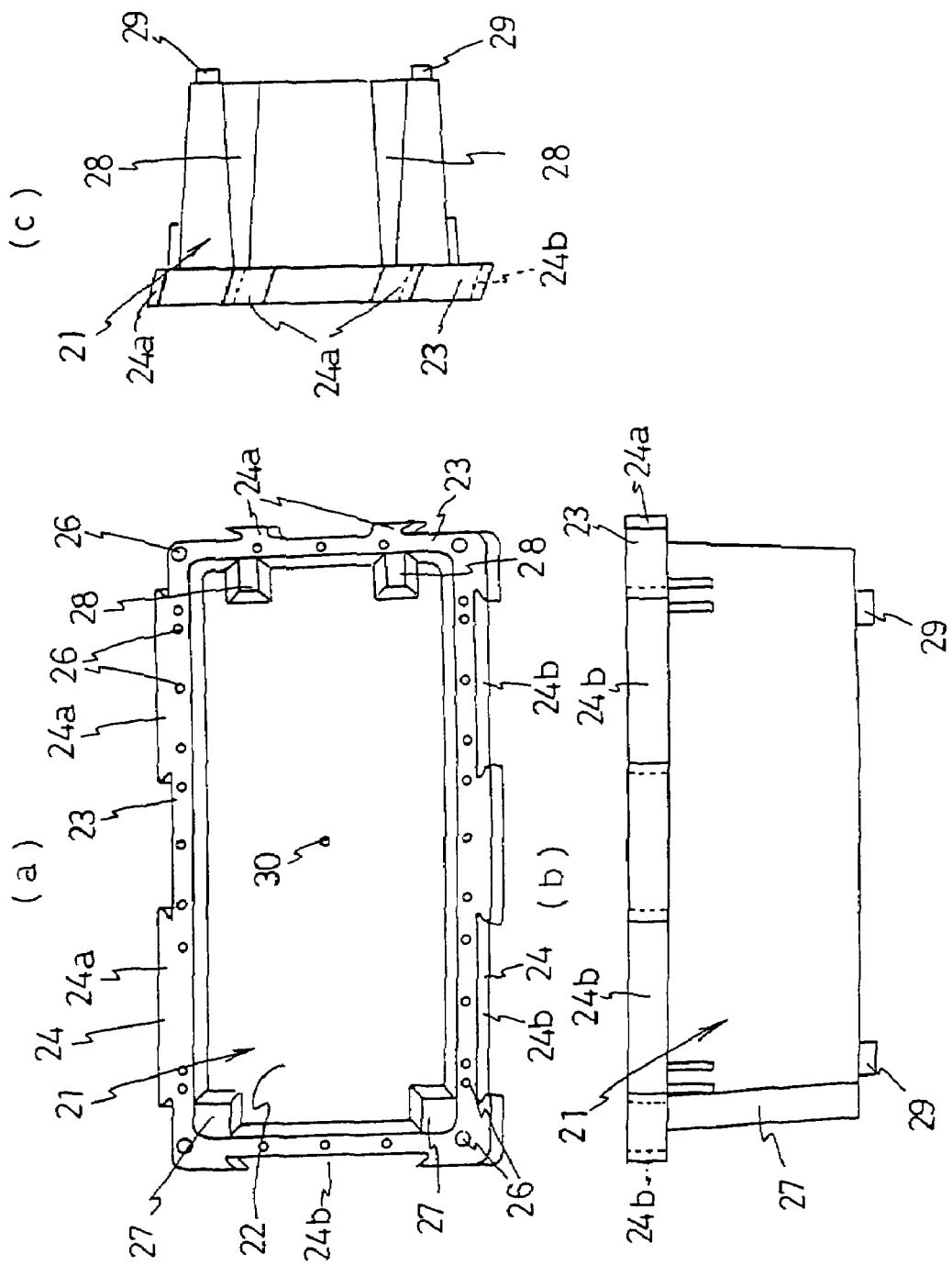
FIG. 14 shows still another example of the article accommodating case of the present invention, with FIG. 14 (*a*) being a plan view, FIG. 14 (*b*) being a front view, and FIG. 14 (*c*) being a side view.

FIGS. 14 (a), 14 (b) and 14 (c) show still another example of the article accommodating case of the present invention. This article accommodating case 21 differs from the abovementioned article accommodating case 11 only in that the respective coupling elements of the dovetail projections 24a and dovetail grooves 24b of the dovetail coupling means 24 are formed so that these elements are formed in the flanges 23 so that these element are inclined along the short side direction of the case 21. Furthermore, the symbol 22 indicates the opening, the symbol 26 indicates through-holes, the symbols 27 and 28 indicates beads, the symbol 29 indicates legs, and the symbol 30 indicates water escape holes.

Figure 15:
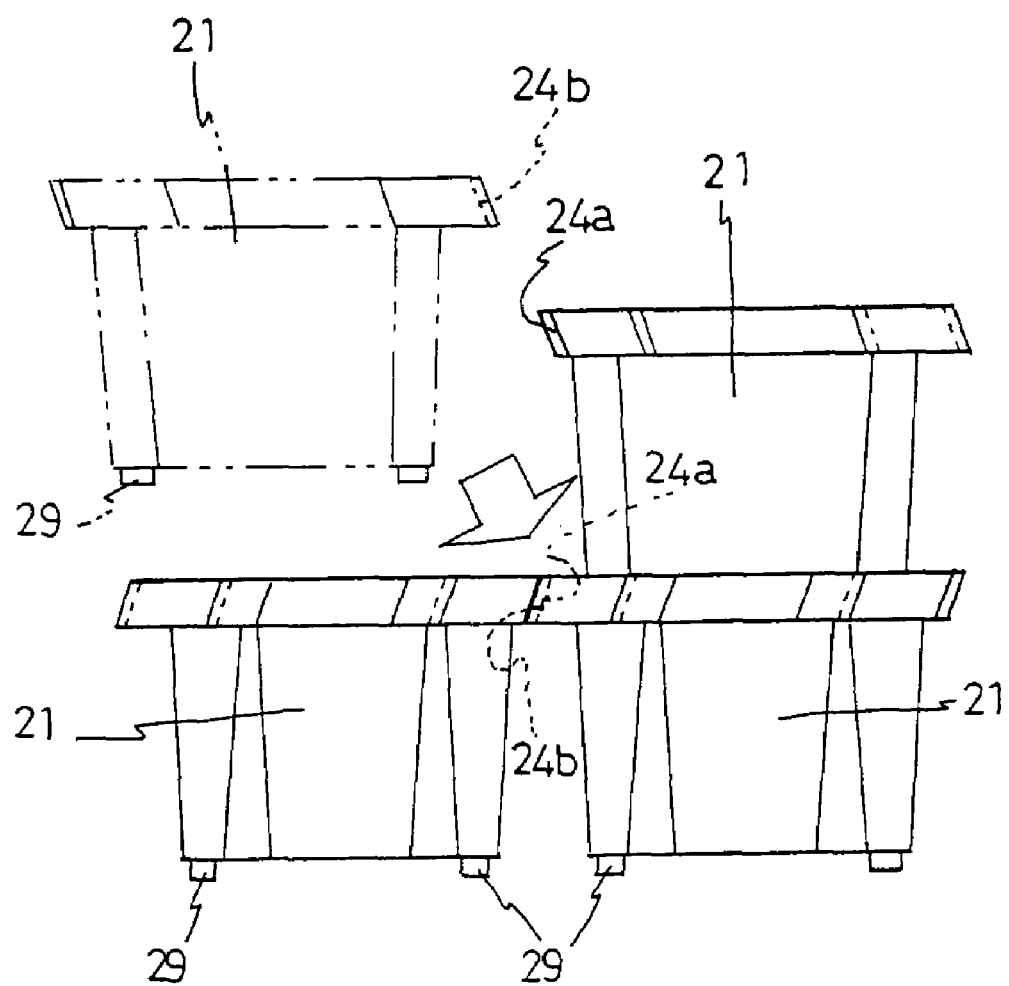
FIG. 15 is a side view showing a state in which article accommodating cases of the type shown in FIG. 14 are connected.
Figure 16:
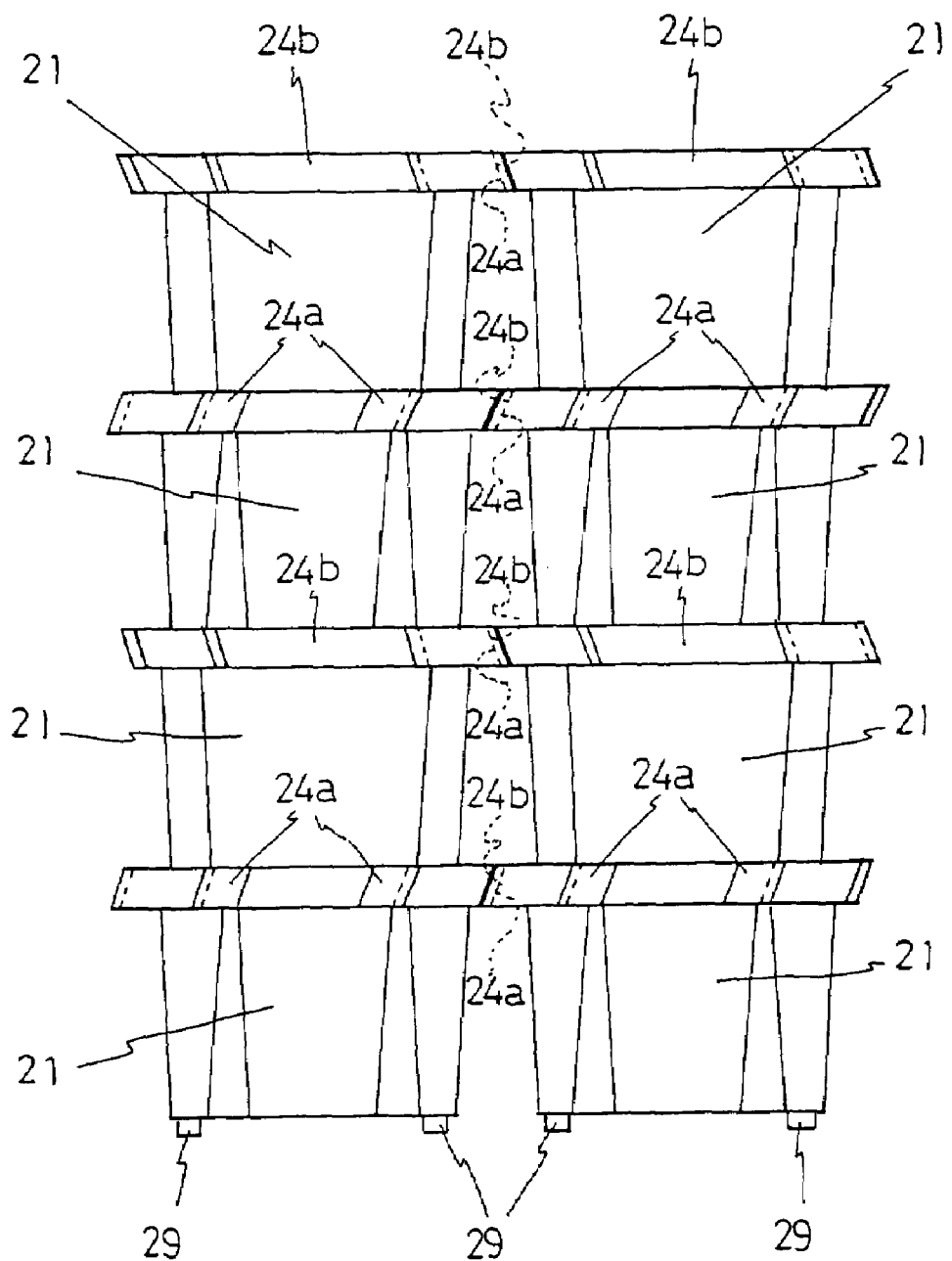
FIG. 16 is a side view showing a state in which a plurality of article accommodating cases of the type shown in FIG. 14 are connected and stacked.

In the article accommodating case 21 shown in this FIG. 14, the coupling by means of the dovetail projections 24a and dovetail grooves 24b of adjacent cases 21, 21 is accomplished by insertion from above at an inclination in the short side direction of the case as shown in FIG. 15. Furthermore, in the stacked state in which articles are accommodated in the cases, the coupling by means of the dovetail projections 24a and dovetail grooves 24b of adjacent cases 21, 21 is arranged so that the slip-out direction is alternately different above and below as shown in FIG. 16. Accordingly, even if the stacked cases are shaken in the left-right direction during transport by means of a forklift or the like, the coupling by means of the dovetail projections 24a and dovetail grooves 24b tends to resist the slipping out of these parts, so that load collapse tends to be prevented in the same manner as in the abovementioned article accommodating case 11.

An embodiment of the article accommodating case of the present invention was described above. However, the present invention is not limited in any way by the embodiment described above; various modifications and alterations are possible within the scope of the technical concept of the present invention described in the claims.

For example, in the abovementioned embodiment, dovetail coupling means were formed in the flanges in all four directions; however, it would also be possible to form dovetail coupling means only in the flanges located in the directions of the long sides, and to utilize the flanges located in the directions of the short sides as handles. Furthermore, the legs formed on the four corners of the case may be integrally formed by recessing the bottom wall of the case, or may be formed by making the bottom wall of the case a flat surface, and causing only the legs to protrude downward. Furthermore, in the abovementioned embodiment, in the formation of the respective coupling elements of the dovetail projections and dovetail grooves of the dovetail coupling means in the flanges at an inclination, an embodiment was indicated in which these elements were inclined along the longitudinal direction of the case or along the short side direction of the case; however, the present invention is not limited to these directions. Furthermore, the article accommodating case of the present invention is not limited to a case for accommodating articles in a factory or the like. There are no restrictions on the types of articles that are accommodated; e. g., the present invention may be applied to cases that accommodate beer bottles, cases that accommodate vegetables and the like. Furthermore, there are no restrictions on the material of the case; the article accommodating case of the present invention can be manufactured using various types of materials such as plastic, wood, metal or the like.

INDUSTRIAL APPLICABILITY

In the article accommodating case of the present invention described above, adjacent cases can be easily and firmly connected by causing dovetail projections formed in the flanges of one adjacent case to engage with dovetail grooves formed in the flanges of another adjacent case, so that load collapse tends not to occur when these cases are placed side by side on a pallet and are further stacked and transported by means of a forklift. Accordingly, this case can be widely used as a case for accommodating parts in a factory or the like, a case for accommodating beer bottles or a case for accommodating vegetables or the like.

The invention claimed is:

1. An article accommodating case having the shape of a generally rectangular box that is open at the top, wherein flanges that protrude outward are formed on the outside surfaces of the opening edges of the respective side walls, dovetail projections and dovetail grooves of a dovetail coupling are formed respectively in the flanges of side walls that are opposed to one another, and outer surfaces of the dovetail projections and surfaces of the dovetail grooves that are adapted to engage outer surfaces of cooperating dovetail projections are inclined with respect to a vertical axis of the case, so that engagement of the case with another identical case requires that the case be moved along a path of engagement that is inclined with respect to the vertical axis.

2. The article accommodating case according to claim 1, wherein through-holes are formed in said flanges.

3. The article accommodating case according to claim 2, wherein the through-holes formed in said flanges serve as water escape holes.

4. The article accommodating case according to claim 1, wherein legs are formed on four corners of a bottom wall of said case.

5. The article accommodating case according to claim 1, wherein the respective side walls of said case are formed so that the side walls are inclined with respect to the vertical axis such that the case is tapered, inwardly protruding beads are formed on a pair of the side walls that face each other, the beads form corresponding recesses on the outer surface of the case, and, in a first stacking position in which the case is a first case and an upper case of a stack of identical cases, the recesses are adapted to engage with the beads of a second case, which is identical to and nested with the first case, and when the first case is rotated by 180 degrees in a horizontal plane from the first stacking position to a second stacking position, bottom walls of legs of the first case are adapted to be carried on upper walls of the beads of the second case.

6. The article accommodating case according to claim 4, wherein water escape holes are formed in a bottom wall of the case or bottom walls of the legs.

7. The article accommodating case according to claim 1, wherein the case is prevented, by the inclination of the surfaces, from moving in the direction of the vertical axis with respect to the other identical case when at least one of the dovetail projections is engaged with a dovetail groove of the other identical case or when at least one of the dovetail grooves is engaged with a dovetail projection of the other identical case.

8. The article accommodating case according to claim 1, wherein the dovetail grooves and the dovetail projections have center axes that are aligned with the path of engagement, and the center axes of the dovetail grooves and the dovetail projections are inclined with respect to the vertical axis.

9. An article accommodating case having a box-like shape with an open top, wherein the case has a central axis, which is perpendicular to a bottom wall of the case, the case has four walls, which include two end walls, which are opposite to one another, and two side walls, which are opposite to one another, outwardly protruding flanges are formed on outside surfaces of upper edges of the four walls, a dovetail projection is formed on the flange of one of the end walls and one of the side walls, and a dovetail groove is formed on the flange of the other of the end walls and the other of the side walls, wherein the dovetail grooves and the dovetail projections are adapted to engage dovetail projections and dovetail grooves, respectively, of a another, identical, article accommodating case, and outer surfaces of the dovetail projections and surfaces of the dovetail grooves that are adapted to engage outer surfaces of cooperating dovetail projections are inclined with respect to a central axis of the case, so that engagement of the case with the other identical case requires that the case be moved along a path of engagement that is inclined with respect to the central axis.

10. The article accommodating case according to claim 9, wherein through-holes are formed in said flanges.

11. The article accommodating case according to claim 10, wherein the through-holes formed in said flanges are water escape holes.

12. The article accommodating case according to claim 9, wherein legs are formed in four corners of the bottom wall.

13. The article accommodating case according to claim 12, wherein water escape holes are formed in the bottom wall of said case or in bottom walls of the legs.

14. The article accommodating case according to claim 9, wherein the walls of said case are inclined with respect to the central axis such that the case is tapered, inwardly protruding beads are formed on the side walls, recesses are formed in the outer surface of the case in correspondence with the beads, and, in a first stacking position in which the case is a first case and an upper case of a stack of identical cases, the recesses are adapted to engage with the beads of a second case, which is identical to and nested with the first case, and when the first case is rotated by 180 degrees in a horizontal plane from the first stacking position to a second stacking position, bottom walls of legs of the first case are adapted to be carried on upper walls of the beads of the second case.

15. The article accommodating case according to claim 9, wherein the case is prevented, by the inclination of the surfaces, from moving in the direction of the central axis with respect to another identical case when at least one of the dovetail projections is engaged with a dovetail groove of the other identical case or when at least one of the dovetail grooves is engaged with a dovetail projection of the other identical case.

16. The article accommodating case according to claim 9, wherein the dovetail grooves and the dovetail projections have center axes that are aligned with the path of engagement, and the center axes of the dovetail grooves and the dovetail projections are inclined with respect to the center axis of the case.

* * * * *